US012641628B2

(12) United States Patent
Miao et al.

(10) Patent No.: US 12,641,628 B2
(45) Date of Patent: May 26, 2026

(54) METHODS FOR SIDELINK COMMUNICATION, TERMINAL DEVICE, AND COMPUTER READABLE MEDIA

(71) Applicant: NEC CORPORATION, Tokyo (JP)

(72) Inventors: Zhaobang Miao, Beijing (CN); Gang Wang, Beijing (CN); Lin Liang, Beijing (CN)

(73) Assignee: NEC CORPORATION, Tokyo (JP)

( * ) Notice: Subject to any disclaimer, the term of this patent is extended or adjusted under 35 U.S.C. 154(b) by 325 days.

(21) Appl. No.: 18/036,554

(22) PCT Filed: Dec. 23, 2020

(86) PCT No.: PCT/CN2020/138506
§ 371 (c)(1),
(2) Date: May 11, 2023

(87) PCT Pub. No.: WO2022/133771
PCT Pub. Date: Jun. 30, 2022

(65) Prior Publication Data
US 2024/0015770 A1     Jan. 11, 2024

(51) Int. Cl.
*H04W 72/40*          (2023.01)
*H04W 72/51*          (2023.01)
(52) U.S. Cl.
CPC ........... *H04W 72/40* (2023.01); *H04W 72/51* (2023.01)
(58) Field of Classification Search
CPC .............................. H04W 72/40; H04W 72/51
See application file for complete search history.

(56) References Cited

U.S. PATENT DOCUMENTS 11,659,521 B2 * 5/2023 Wang .................... H04W 72/02
                                              370/329
2020/0351032 A1 * 11/2020 Wu ........................ H04L 1/1861
                      (Continued)

FOREIGN PATENT DOCUMENTS

WO        2020/088112 A1     5/2020

OTHER PUBLICATIONS

TCL Communication, "Resource allocation for power saving", 3GPP TSG RAN WG1 #103-e R1-2007892, Nov. 13, 2020, 7 pages.
(Continued)

*Primary Examiner* — Won Tae C Kim
(74) *Attorney, Agent, or Firm* — Sughrue Mion, PLLC

(57)                    ABSTRACT
Embodiments of the present disclosure provide a solution for sidelink communications. In a method for communications, in accordance with a determination that a communication between a first terminal device and a second terminal device is in a power saving mode, the first terminal device determines a first candidate resource set from a resource pool for the first terminal device. The first candidate resource set is mapped to a first feedback occasion for the second terminal device. The first terminal device transmits, to the second terminal device, first data on a first resource of the first candidate resource set. The first terminal device then receives, from the second terminal device, a first feedback message to the first data during the first feedback occasion. Embodiments of the present disclosure provide a sidelink feedback mechanism on the PSFCH, which is especially friendly to power saving terminal devices. With the proposed feedback mechanism, a tradeoff between the power consumption and the time sensitive requirements of the terminal devices can be achieved, while the conflict of power selection in the sidelink resource pool can be avoided.

2 Claims, 7 Drawing Sheets

(56) References Cited

U.S. PATENT DOCUMENTS

| | | | | |
|---|---|---|---|---|
| 2021/0127383 A1* | 4/2021 | Hui | ........................ | H04W 72/20 |
| 2023/0007631 A1* | 1/2023 | Chae | ..................... | H04L 1/1896 |

OTHER PUBLICATIONS

Panasonic, "Remaining issue on physical layer procedures for sidelink in NR V2X", 3GPP TSG RAN WG1 #101 R1-2003943, Jun. 5, 2020, 5 paged.
Intel Corporation, "Resource Allocation Enhancements for NR Sidelink", 3GPP TSG RAN WG2 Meeting #112e R2-2008986, Nov. 13, 2020, 5 pages.
International Search Report for PCT/CN2020/138506, dated Sep. 24, 2021.
Written Opinion for PCT/CN2020/138506, dated Sep. 24, 2021.

* cited by examiner

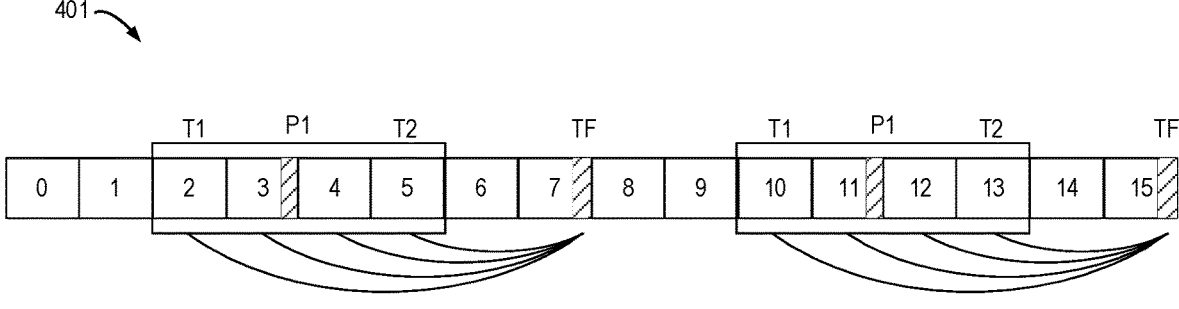
Fig. 4A
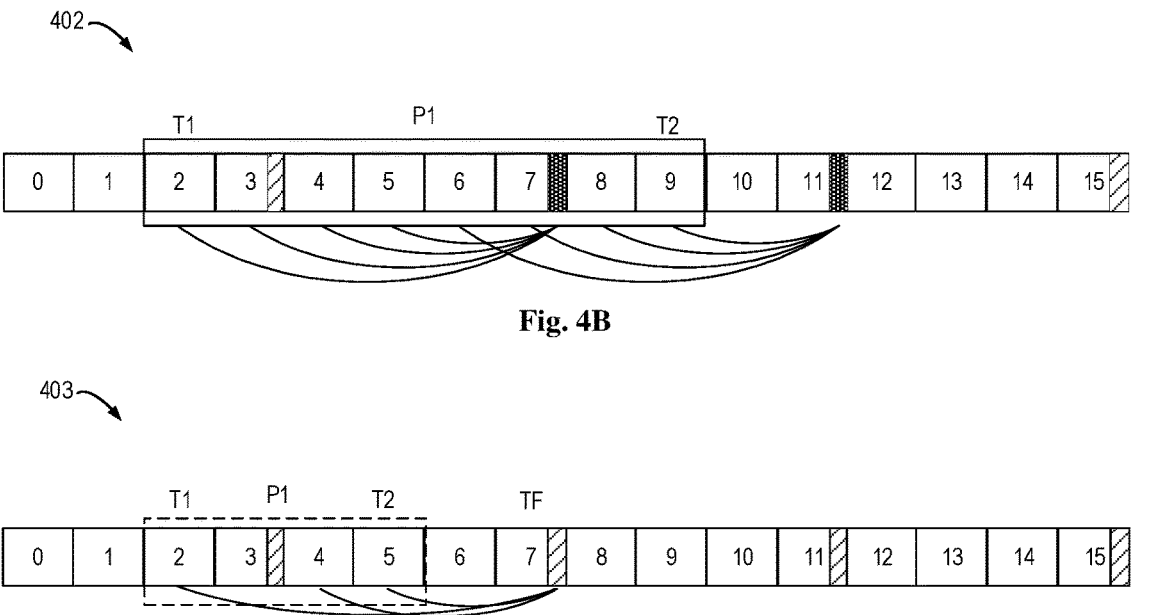
Fig. 4B
Fig. 4C

*sl-PS-PSFCH-Period-r16 = 8;sl-PSFCH-Period-r16 = 4; sl-MinTimeGapPSFCH-r16 = 2*

*sl-PS-PSFCH-Period-r16 = 16;sl-PSFCH-Period-r16 = 4; sl-MinTimeGapPSFCH-r16 = 2*

*sl-PS-PSFCH-Period-r16 = 16;sl-PSFCH-Period-r16 = 2; sl-MinTimeGapPSFCH-r16 = 2*

700

710

COMMUNICATION IN POWER SAVING MODE?

Y     720

DETERMINE A FIRST CANDIDATE RESOURCE SET FROM A RESOURCE POOL FOR THE FIRST TERMINAL DEVICE

730

TRANSMIT FIRST DATA ON A FIRST RESOURCE OF THE FIRST CANDIDATE RESOURCE SET

740

RECEIVE A FIRST FEEDBACK MESSAGE TO THE FIRST DATA DURING THE FIRST FEEDBACK OCCASION

800

810

RECEIVE FIRST DATA ON A FIRST RESOURCE

820

COMMUNICATION IN POWER SAVING MODE?

Y

830

DETERMINE A FIRST FEEDBACK OCCASION MAPPED TO THE FIRST RESOURCE

840

TRANSMIT A FIRST FEEDBACK MESSAGE TO THE FIRST DATA DURING THE FIRST FEEDBACK OCCASION

900

940

950

910

PROCESSOR

920

MEMORY

930

PROG

METHODS FOR SIDELINK COMMUNICATION, TERMINAL DEVICE, AND COMPUTER READABLE MEDIA

CROSS REFERENCE TO RELATED APPLICATIONS

This application is a National Stage of Application No. PCT/CN2020/138506 filed Dec. 23, 2020.

FIELD

Embodiments of the present disclosure generally relate to the field of communication, and more particularly, to a solution of sidelink communications.

BACKGROUND

As one of the key technologies for the fifth-generation communication system, which is also referred to new radio (NR) technology, vehicle to everything (V2X) technologies can be based on D2D communication technologies, for example, the sidelink communication technology.

As compared with the traditional cellular network (e.g., the LTE network system), the NR communication system is modified and upgraded in terms of components, control plane, data plane, resource allocation, channel design, and the like. The Hybrid Automatic Repeat Request (HARQ) feedback operation is also one of the main differences between LTE and NR sidelink technologies. HARQ feedback operation is an important feature to improve reliability and performance of communication systems. In the NR system, the NR sidelink technology supports the HARQ feedback on a physical layer via the physical sidelink feedback channel (PSFCH). The legacy HARQ feedback mechanism used for sidelink communications is not designed in taking the power saving demand into consideration. Moreover, a frequent switching between transmission of traffic on a physical sidelink share channel (PSSCH) and reception of HARQ feedback on the PSFCH at a transmitter terminal device as well as a corresponding switching between receipt of the traffic and transmission of HARQ feedback at the receiver terminal device will result in further power consumptions.

SUMMARY

In general, example embodiments of the present disclosure provide a solution of sidelink feedback.

In a first aspect, there is provided a method for communications. The method comprises: in accordance with a determination that a communication between a first terminal device and a second terminal device is in a power saving mode, determining, at the first terminal device, a first candidate resource set from a resource pool for the first terminal device, the first candidate resource set being mapped to a first feedback occasion for the second terminal device; transmitting, to the second terminal device, first data on a first resource of the first candidate resource set; and receiving, from the second terminal device, a first feedback message to the first data during the first feedback occasion.

In a second aspect, there is provided a method for communications. The method comprises: receiving, at a second terminal device and from a first terminal device, first data on a first resource; in accordance with a determination that a communication between the first terminal device and the second terminal device is in a power saving mode, determining a first feedback occasion for the second terminal device, the first feedback occasion being mapped to a first candidate resource set comprising the first resource; and transmitting, to the first terminal device, a first feedback message to the first data during the first feedback occasion.

In a third aspect, there is provided a first terminal device. The first terminal device comprises a processor configured to perform the method according to the first aspect.

In a fourth aspect, there is provided a second terminal device. The second terminal device comprises a processor configured to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4A illustrates a schematic diagram of an example mapping between the resource for transmission on the PSSCH and the resource for feedback on the PSFCH in accordance with some embodiments of the present disclosure;

FIG. 4B illustrates a schematic diagram of another example mapping between the resource for transmission on the PSSCH and the resource for feedback on the PSFCH in accordance with some embodiments of the present disclosure;

FIG. 4C illustrates a schematic diagram of yet another example mapping between the resource for transmission on the PSSCH and the resource for feedback on the PSFCH in accordance with some embodiments of the present disclosure;

Throughout the drawings, the same or similar reference numerals represent the same or similar elements.

DETAILED DESCRIPTION OF EMBODIMENTS

Figure 1:
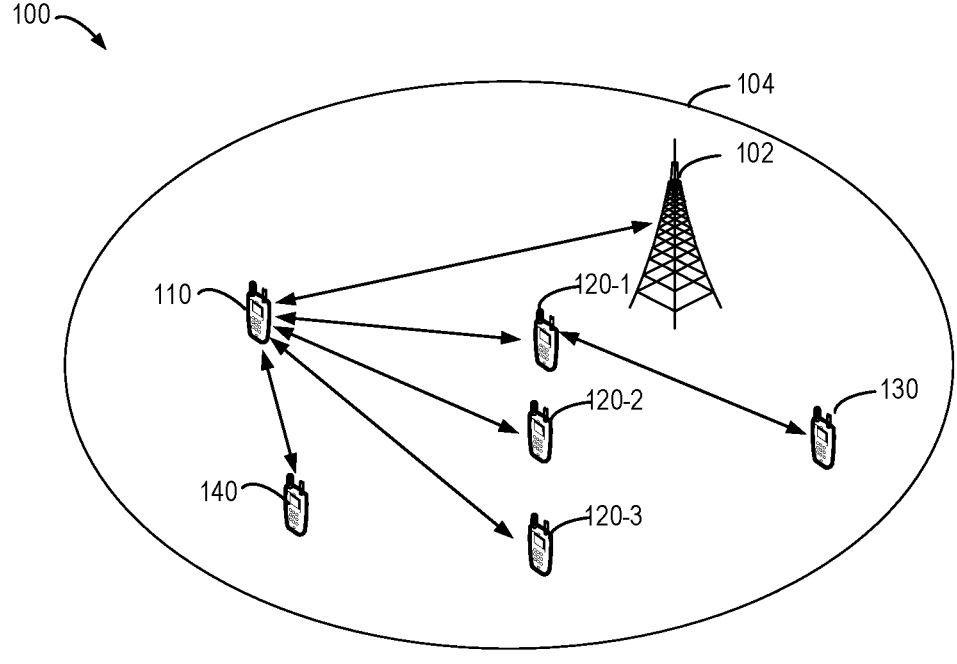
FIG. 1 illustrates an example communication environment in which embodiments of the present disclosure may be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" or "user equipment" (UE) refers to any device having wireless or wired communication capabilities. The communications may involve transmitting and/or receiving wireless signals using electromagnetic signals, radio waves, infrared signals, and/or other types of signals suitable for conveying information over air. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment."

As used herein, the terms "first", "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As previously mentioned, the HARQ feedback operation is an important feature to improve reliability with better system performance, which is also one of the main differences between LTE and NR sidelinks technologies. The NR sidelink technology supports the HARQ feedback on the physical layer over the PSFCH. From the perspective of a receiver (Rx) UE, which receives a transmission on the PSSCH, the HARQ feedback for the transmission is transmitted to a transmitter (Tx) UE on the PSFCH. A Zadoff-Chu sequence is transmitted near the end of the sidelink resource in a slot on the PSFCH, which is repeated over two OFDM symbols. The time resources on the PSFCH are (pre-)configured to occur once in every 1, 2, or 4 slots. The frequency/code resources are derived implicitly from those used by the associated transmission on the PSSCH, together with the L1 identity of the UE acting as the transmitter on the PSSCH. When groupcast with ACK/NACK feedback is used, the identity of the UE may be selected to be a group identity of the UEs transmitting ACK/NACK feedback on the PSFCH.

The power consumption on transmission and receipt of HARQ feedbacks on the PSFCH is considerable, especially for the power saving terminal devices. The existing period of the HARQ feedback (i.e., every 1, 2 or 4 slots) as well as the timing of reporting the HARQ feedback, i.e., 2 or 3 slots after receipt of the data transmission on the PSSCH, are not optimal from the terminal device's power saving perspective. Further, it may result in a frequent switching between Tx the Rx modes, yielding unnecessary power consumption.

It may be desirable to transmit as much feedback as possible in a single feedback occasion, rather than distributing the feedbacks in multiple occasions with short intervals. Therefore, a longer feedback period on the PSFCH has been proposed, for example, the period may be extended from 1 slot to 16 slots. However, such a long feedback period may be undesirable for latency sensitive traffic. Furthermore, there may be conflict of resource selection for the long feedback period and a normal feedback period on the PSFCH.

In order to solve the above and other potential problems, embodiments of the present disclosure provide a feedback scheme for sidelink communication, which can effectively reduce transmission and receipt occasions for the feedback on the PSFCH. The proposed feedback scheme can achieve a tradeoff between the power consumption and the time sensitive requirements of the terminal devices. Moreover, the conflict of resource selection in the sidelink resource pool can be avoided.

FIG. 1 illustrates an example communication environment 100 in which embodiments of the present disclosure may be implemented. As shown in FIG. 1, the communication environment 100, which may be a part of a communication network, includes a network device 102, a first terminal device 110, second terminal devices 120-1 to 120-3 (which may be collectively referred to as the second terminal device 120), a third terminal device 130 and a fourth terminal device 140. The network device 102 hosts a cell 104. Although the terminal devices 110 to 140 are shown to be located in the coverage of the cell 104, this is merely given as an example implementation without suggesting any limitations as to the scope of the present disclosure. In other embodiments, some of the terminal devices, for example, the third and fourth terminal devices 130 and 140 may be located outside the cell 104.

The terminal devices 110 to 140 may communicate with the network device 102 via a communication channel. For transmissions from the network device 102 to the terminal devices 110 to 140, the communication channel may be referred to as a downlink (DL) channel, whereas for transmissions from the terminal device 110 to 140 to the network device 102, the communication channel may alternatively be referred to as an uplink (UL) channel.

Additionally, the terminal devices 110 to 140 may communicate with each other via the sidelink. In the context of the embodiments of the present disclosure, the first terminal device 110, the third terminal device 130 and the fourth terminal device 140 may act as a transmitter (Tx) terminal device, while the second terminal device 120 may act as a receiver (Rx) terminal device. In some embodiments, the first terminal device 110 may communicate with the second terminal devices 120-1 to 120-3 in groupcast manner. Before performing data transmission on the PSSCH, the terminal devices 110 to 140 may select resources for the data transmission by randomly selecting in a sidelink resource pool without sensing, or select resources for the data transmission after performing full or partial sensing in the resource pool. In some embodiments, some of the terminal devices 110 to 140 may be so-called power saving terminal devices and operate in a power saving mode, or alternatively, the receiving capability of the terminal devices 110 to 140 may be limited. Such power saving terminal devices may have no capability of sensing, or the full sensing may be disabled.

The first terminal device 110, which acts as the transmitter terminal device, may receive a feedback message for the data transmission from the second terminal device 120 on the PSFCH. In this case, the first terminal device 110 needs to switch from a Tx mode to a Rx mode. In terms of power saving, terminal devices 110 to 140 may expect to consume as little power as possible on transmission or receipt of the feedback for the data transmission.

It is to be understood that the number of the terminal devices 110 to 140, as well as the number of the network device 102 as shown in FIG. 1 are merely given for the purpose of illustration without suggesting any limitations. The communication environment 100 may include any suitable number of terminal devices, any suitable number of network devices, and any suitable number of other communication devices adapted for implementing embodiments of the present disclosure.

It would be appreciated that there may be various wireless communications as well as wireline communications (if needed) among all the communication devices. Moreover, it is noted that although the network device 102 is schematically depicted as a base station and the terminal devices 110 to 140 are schematically depicted as a mobile phone in FIG. 1, it is understood that these depictions are only for example without suggesting any limitation. In other embodiments, the network device 102 may be any other wireless network device, and the terminal devices 110 to 140 may be any other wireless communication device.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G), beyond 5G, the sixth generation (6G) communication protocols.

Figure 2:
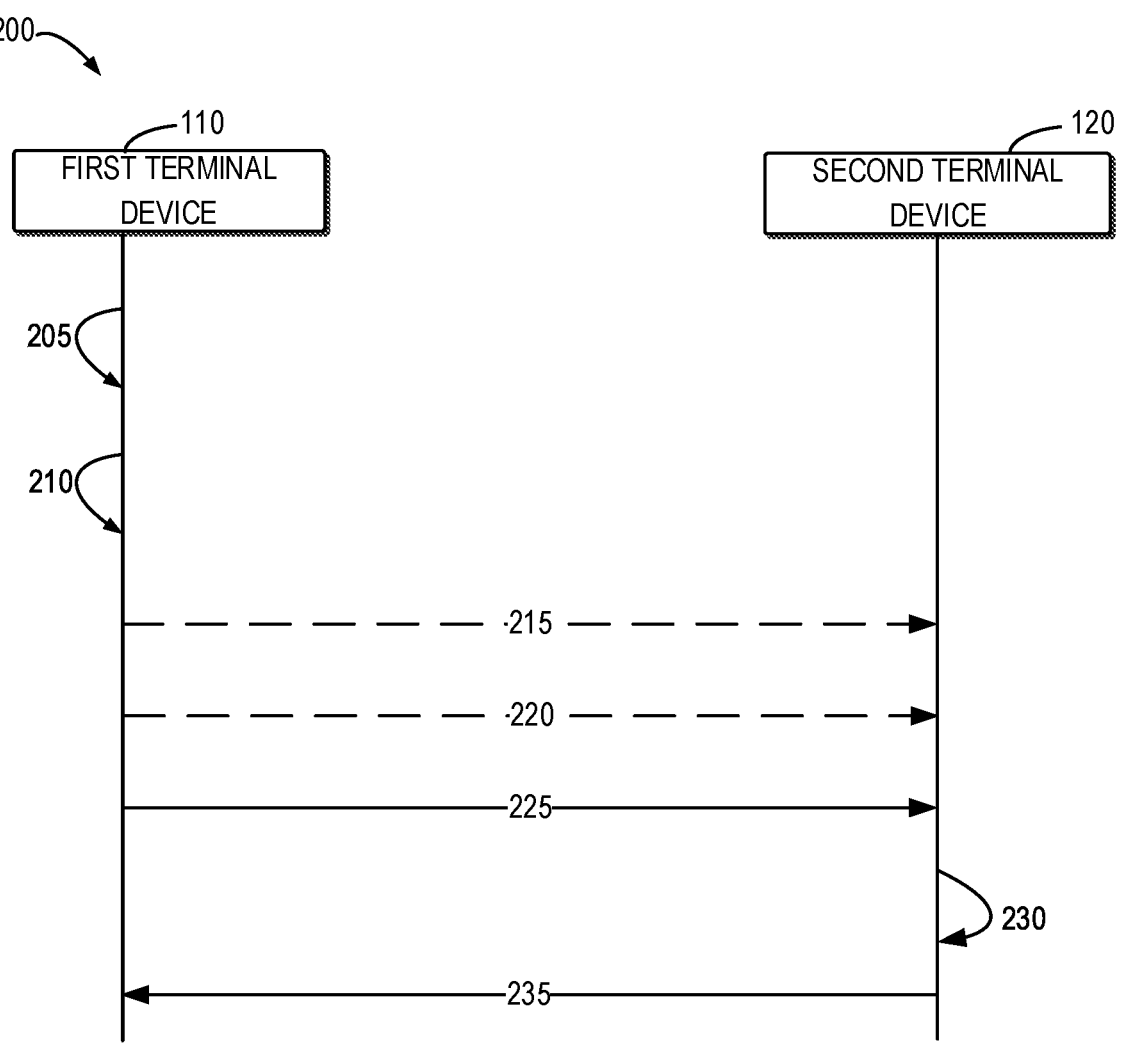
FIG. 2 illustrates an example signaling chart showing an example sidelink feedback process in accordance with some embodiments of the present disclosure.

FIG. 2 illustrates an example signaling chart showing an example sidelink feedback process 200 in accordance with some embodiments of the present disclosure. As shown in FIG. 2, the process 200 may involve the first terminal device 110 and the second terminal device 120, and selectively, the third device 130 as well as the fourth device 140 as shown in FIG. 1. For the purpose of discussion, the process 200 will be described with reference to FIG. 1.

In some embodiments, sidelink parameters may be pre-configured by a corresponding higher layer (e.g., the radio resource control (RRC) layer) of the first terminal device 110 and the second terminal device 120. The sidelink parameters may include, but not limited to, a duration and a start resource index of the first candidate resource set, and a number of candidate resource sets comprising the first candidate resource set. According to the embodiments, each of the candidate resource sets may be alternatively arranged in a time domain, which will be discussed in details below.

The first terminal device 110 determines 205 that the communication between the first terminal device 110 and the second terminal device 120 is in the power saving mode. For example, if either the Tx terminal device or the Rx terminal device is a power saving UE, the communication between the Tx and Rx terminal devices may be considered to be in the power saving mode. In the groupcast scenario, where the first terminal device 110 transmits the first data to a plurality of destinations (e.g., the second terminal devices 120-1 to 120-3) via groupcast, if any of the second terminal devices 120-1 to 120-3 is a power saving UE, the first terminal device 110 may determine that the communication with the group of second terminal device 120 is in the power saving mode. In this scenario, the destination of the communication between the first terminal device 110 and the group of the second terminal devices 120-1 to 120-3 is regarded as a power saving destination. In both unicast and groupcast scenarios, the first terminal device 110 may determine the destination from the RRC parameter, SL-DestinationIdentity-r16.

In some embodiments, the first terminal device 110 may determine the communication to be in power saving mode based on one or more of a power saving indicator, a capability report and a resource selection scheme for at least one of the first and second terminal devices 110 and 120. By way of example, the power saving indicator may be pre-configured by a higher layer of the first and second terminal devices 110 and 120 for indicating whether the terminal devices 110 and 120 are the power saving UEs, or alternatively, the parameter may indicate a power saving level of the terminal device 110 or 120 exceeds a power saving threshold. By way of another example, if the terminal device 110 or 120 is configured with partial sensing or random resource selection as the resource selection scheme, the respective one of terminal device 110 and 120 may be regarded as the power saving UE.

If the first terminal device 110 determines that the communication between the first terminal device 110 and the second terminal device 120 is in power saving mode in 205, the first terminal device 110 determines 210 a first candidate resource set from the resource pool for the first terminal device 110. In some embodiments, the first candidate resource set is mapped to the first feedback occasion for the second terminal device 120.

Figure 3A:
FIG. 3A illustrates a schematic diagram of an example mapping between the resource for transmission on the PSSCH and the resource for feedback on the PSFCH in accordance with some embodiments of the present disclosure.
Figure 3A:
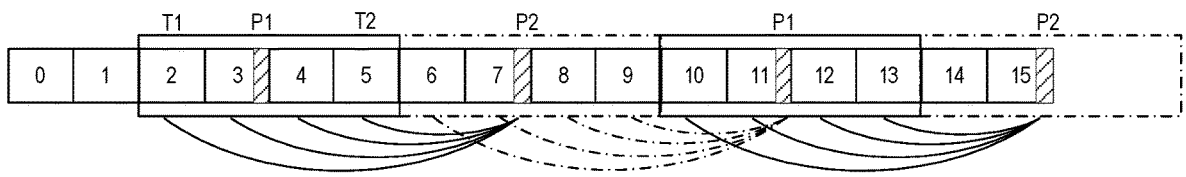

FIG. 3A illustrates a schematic diagram of an example mapping 301 between the resource for transmission on the PSSCH and the resource for feedback on the PSFCH in accordance with some embodiments of the present disclosure. The mapping between the resource for data transmission on the PSCCH and the resource for the HARQ feedback of the data transmission is indicated by parameters sl-PSFCH-Period-r16 and sl-MinTimeGapPSFCH-r16. The parameter sl-PSFCH-Period-r16 may include 0, 1, 2 and 4. The parameter sl-MinTimeGapPSFCH-r16 indicates the minimum time gap between the data transmission on the PSSCH and a corresponding feedback for the data transmission on the PSFCH in the time domain.

In the example as shown in FIG. 3A, the candidate resources in the time domain are divided into N candidate resource sets, where N=2, with a duration of the first candidate resource set including slots 2 to 5 being denoted by P1 and a duration of the second candidate resource set including slot 6 to slot 9 being denoted by P2. Additionally, slots 10 to 13 belong to another first candidate resource set P1. The N candidate resource sets are alternatively arranged in the time domain, like P1, P2, P1, P2 and so on, and each of the N candidate resource sets is mapped to a corresponding feedback occasion. As shown, the first candidate resource set P1 is mapped to the end of the slot 7. For a given terminal device, for example, the Tx terminal device 110 and the Rx terminal device 120, a corresponding candidate resource set may be determined based on a respective terminal identity associated with the first terminal device 110 mode N. For example, the odd number of the terminal identity mode N may correspond to the first candidate resource set P1, while the even number of the terminal identity mode N may correspond to the second candidate resource set P2. In the context of the embodiments of the present disclosure, the terminal identity associated with the first terminal device 110 may be the destination identity (e.g., the terminal identity of the second terminal device 120) or the source identity (e.g., the terminal identity of the first terminal device).

The first candidate resource set may be indicated based on sidelink parameters, for example, preconfigured by the higher layer of the first terminal device 110. In some embodiments, the sidelink parameters may indicate the duration P1 and a start resource index T1 of the first candidate resource set, and a number of candidate resource sets comprising the first candidate resource set, with each of the candidate resource sets alternatively arranged in a time domain. In the example as shown in FIG. 3A, a start resource index T1 is set to be slot 2, and the duration of the first candidate resource set is set to be 4 slots. Additionally, the end resource index T2 of the first candidate resource set may be determined by T2=T1+P1−1.

Figure 3B:
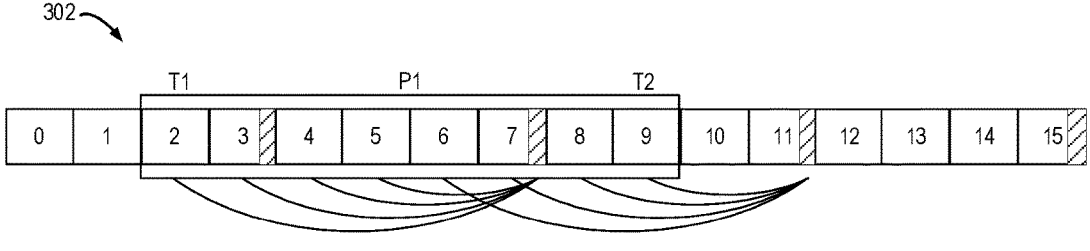
FIG. 3B illustrates a schematic diagram of another example mapping between the resource for transmission on the PSSCH and the resource for feedback on the PSFCH in accordance with some embodiments of the present disclosure.

FIG. 3B illustrates a schematic diagram of another example mapping 302 between the resource for transmission on the PSSCH and the resource for feedback on the PSFCH in accordance with some embodiments of the present disclosure. As shown in FIG. 3B, the duration P1 of the first candidate resource set is set to be 8 slots. As compared with the example shown in FIG. 3A, more slots are divided into a single candidate resource set P1, and as shown, feedback for transmissions on slots 2 to 9 in the first candidate resource set P1 may be received in slots 7 and 11. Such a feedback mechanism is more friendly to latency sensitive traffic.

In some embodiments, the first terminal device 110 may determine the first feedback occasion from a set of feedback occasions preconfigured by the higher layer. The first terminal device 110 may then determine the first candidate resource set based on a mapping rule, which indicates the mapping between the first candidate resource set and the first feedback occasion.

In the above embodiments, in order to determine the first feedback occasion, the first terminal device 110 may determine a first subset of feedback occasions for the first candidate resource set from a set of feedback occasions preconfigured by the higher layer. For example, the first subset of feedback occasions may be determined based on a number of candidate resource sets N including the first candidate resource set, the period of the first feedback occasion, the minimum time gap between the data transmission on the PSSCH and a corresponding feedback for the data transmission on the PSFCH in the time domain (e.g., the parameter s1-MinTimeGapPSFCH-r16), a number of consecutive feedback occasions for a candidate resource set, denoted by L, and a start resource index TF1 and an end resource index TF2 of the preconfigured set of feedback occasions. The first terminal device 110 may then select the first feedback occasion from the first subset of the feedback occasions.

FIG. 4A illustrates a schematic diagram of an example mapping 401 between the resource for transmission on the PSSCH and the resource for feedback on the PSFCH in accordance with some embodiments of the present disclosure. As shown in FIG. 4A, the number of candidate resource sets N is 2, the parameter s1-MinTimeGapPSFCH-r16 is set to be 2, the number of consecutive feedback occasions L is 1, and the resource index TF of each of the feedback occasions is slot 7 and slot 15. Each set of feedback occasions set for a Tx terminal device or a Rx terminal device contains consecutive L resource for feedback, which starts from (A mode N)-th resource and appears in an interval of (N−1)*L resources for feedback of the resource pool, where A denotes a respective terminal identity associated with the first terminal device 110, which may be the destination identity or the source identity.

In the above example, the first terminal device 110 may determine the duration P1 of the first candidate resource set as follows:

$$T2 = TF - sl\text{-}MinTimeGapPSFCH\text{-}r16 \tag{1}$$

$$T1 = T2 - sl\text{-}MinTimeGapPSFCH\text{-}r16 - sl\text{-}PSFCH\text{-}Period\text{-}r16 + 1 \tag{2}$$

where T1 denotes the start resource index of the first candidate resource set, T2 denotes the end resource index of the first candidate resource set, and thus the duration P1=T2−T1+1.

FIG. 4B illustrates a schematic diagram of another example mapping 402 between the resource for transmission on the PSSCH and the resource for feedback on the PSFCH in accordance with some embodiments of the present disclosure. As shown in FIG. 4B, the number of candidate resource sets N is 2, the parameter s1-MinTimeGapPSFCH-r16 is set to be 2, the number of consecutive feedback occasions L is 2, and a start resource TF1 and an end resource TF2 of the preconfigured set of feedback occasions is set to be slot 7 and slot 11, respectively. Each set of feedback occasions set for a Tx terminal device or a Rx terminal device contains consecutive L resource for feedback, which starts from (A mode N)-th resource and appears in an interval of (N−1)*L resources for feedback of the resource pool, where A denotes a respective terminal identity associated with the first terminal device 110, which may be the destination identity or the source identity.

In the above example, the first terminal device 110 may determine the duration P1 of the first candidate resource set as follows:

$$T2 = TF2 - sl\text{-}MinTimeGapPSFCH\text{-}r16 \tag{3}$$

$$T1 = TF1 - sl\text{-}MinTimeGapPSFCH\text{-}r16 - sl\text{-}PSFCH\text{-}Period\text{-}r16 + 1 \tag{4}$$

where T1 denotes the start resource index of the first candidate resource set, T2 denotes the end resource index of the first candidate resource set, and thus the duration P1=T2−T1+1.

The first terminal device 110 may then select the first feedback occasion from the first subset of the feedback occasions. In some embodiments, the first terminal device 110 may determine the first feedback occasion based on its transmission on a further resource. FIG. 4C illustrates a schematic diagram of yet another example mapping 403 between the resource for transmission on the PSSCH and the resource for feedback on the PSFCH in accordance with some embodiments of the present disclosure. As shown in FIG. 4C, the first terminal device 110 may determine that a second resource, for example, the slot 2 is selected for transmission of second data from the first terminal device 110. The first terminal device 110 may then determine that the second resource (e.g., the slot 2) is mapped to the first feedback occasion, which is at the end of the slot 7. In this case, the first terminal device 110 may select the first feedback occasion for receipt of the first feedback message. In this way, feedbacks for the first and second data can be received in a single feedback occasion, that is, the first feedback occasion. The first terminal device 110 may then select one of unoccupied resources which are also mapped to the determined first feedback occasion to be the first resource for transmission of the first data, for example, the slot 5.

In some other embodiments, the first terminal device 110 may determine the first feedback occasion based on other transmissions to the second terminal device 120. Continuing to refer to FIG. 4C, the first terminal device 110 may determine that a third resource, for example, the slot 4 is selected, by the third terminal device 130, for transmission of third data to the second terminal device 120. The first terminal device 110 may determine that the third resource (e.g., the slot 4) is mapped to the first feedback occasion, which is at the end of the slot 7. In this case, to reduce the transmission of feedback for the second terminal device 120, the first terminal device 110 may select the first feedback occasion for receipt of the first feedback message. The first terminal device 110 may then select one of unoccupied resources which are also mapped to the determined first feedback occasion to be the first resource for transmission of the first data, for example, the slot 5.

In some embodiments, the first terminal device 110 may determine a set of unoccupied resources from the first candidate resource set. For example, the physical layer of the first terminal device 110 may report an intersection of the unoccupied resources in the resource pool and the first candidate resource set to a higher layer of the first terminal device 110, such as, the MAC layer. The higher layer of the first terminal device 110 may then select the first resource from the intersection.

In a case where the first terminal device 110 performs full sensing in resource selection, the physical layer may report the intersection of the unoccupied resources in the resource pool and the first candidate resource set to the higher layer. In a case where the first terminal device 110 performs partial sensing in resource selection, the physical layer may select and report the slot resources within a resource selection window which is also within the first candidate resource set as candidate slot resources. In a case where the first terminal device 110 performs random resource selection in the resource pool, the first terminal device 110 may report a set of resources which is also within the first candidate resource set to the higher layer.

In some other embodiments, the physical layer of the first terminal device 110 may report the unoccupied resources in the resource pool to the MAC layer of the first terminal device 110. In this case, the MAC layer of the first terminal device 110 may determine intersection of the unoccupied resources in the resource pool and the first candidate resource set. The MAC layer of the first terminal device 110 may then adjust probabilities of the first candidate resource set by increasing probabilities of the intersection, such that the first resource is selected from the adjusted first candidate resource set. For example, the first terminal device 110 may assign a first probability to resources in the intersection, and a second probability to the remaining of the unoccupied resources, the first probability is higher than the second probability.

In still other embodiments, if the selected resource for transmission of the first data is not in the first candidate resource set, the first terminal device 110 may disable the PSFCH transmission and reception, for example, the first terminal device 110 may set a HARQ feedback enabled/disabled indicator field in sidelink control information (SCI) as the value "0".

In some example embodiments, the period of the first feedback occasion is longer than the conventional period of a second feedback occasion for a communication in a non-power saving mode.

In the above embodiments, the first feedback occasion may correspond to a fourth resource, and the first feedback message is received in at least one reserved resource block of the fourth resource. Additionally, the non-reserved resource blocks of the fourth resource are for receipt of a second feedback message during the second feedback occasion.

In some embodiments, the first terminal device 110 may receive the RRC message from the network device 102. The RRC message may indicate the period of the first feedback occasion, or alternatively, a scaling factor of period of the second feedback occasion. The first terminal device 110 may determine the first feedback occasion based on the RRC message.

By way of example, the RRC message may indicate the period of the first feedback occasion by the parameter sl-PS-PSFCH-Period, indicating 8, 16, 32 and so on, as non-limiting examples. By way of another example, the RRC message may indicate the scaling factor of the period of the second feedback occasion by a parameter sl-PSFCH-Period, such as, 2, 3, 4 and so on. In this example, the period of the first feedback occasion may be determined by scaling the period of the second feedback occasion based on the scaling factor.

In some embodiments, the first terminal device 110 may transmit 215 the SCI to the second terminal device 120. The SCI may be in a new format, such as, a format 2-C, and a field of the second stage SCI may indicate whether the first feedback occasion preconfigured by the RRC message or the conventional second feedback occasion is activated. For example, a value "10", "11" of the second stage SCI format in the first stage SCI may indicate the new format 2-C. If the first feedback occasion is activated, the first terminal device 110 may determine the period of the first feedback occasion based on the scaling factor and the period of the second feedback occasion.

In some embodiments, the RRC message may indicate indices of resources allocated for the first feedback occasion, or alternatively, indices of resources allocated for the second feedback occasion and so on. By way of example, the RRC message may indicate indices of resources allocated for the first feedback occasion by a new parameter sl-PS-PSFCH-RB-Set. By way of another example, the RRC message may indicate indices of resources indicated for the second feedback occasion by the parameter sl-PSFCH-RB-Set. In this example, the first terminal device 110 may then determine the remaining resources in the resource pool, namely, the resources of the resource pool excluding the resources indicated by the parameter s1-PSFCH-RB-Set to be the resources allocated for the first feedback occasion.

The number of the resource blocks indicated by the parameter sl-PS-PSFCH-RB-Set and the remaining resource blocks indicated by the parameter PSFCH-RB-Set may be expected to be a multiple of $N_{subch} \cdot N_{PSSCH}^{PSFCH}$, where $N_{subch}$ is a number of subchannel of the resource pool and $N_{PSSCH}^{PSFCH}$ is a number of PSSCH slots associated with one slot on the PSFCH.

In the above embodiments, the first terminal device 110 may transmit 220 the SCI to the second terminal device 120. The SCI may be in a new format, such as, a format 2-D, and a field of the second stage SCI may indicate a scaling factor for the second feedback occasion. For example, a value of the field may be "0", "1" or "M", where "0" or "1" indicates that the conventional second feedback occasion is activated, and "M" indicates that the first feedback occasion is activated and the period of which includes a set of resource blocks=M*sl-PSFCH-Period. In this case, a value "10", "11" of the second stage SCI format in the first stage SCI may indicate the new format 2-D. If the first feedback occasion is activated, the first terminal device 110 may determine the period of the first feedback occasion based on the scaling factor and the period of the second feedback occasion.

The first terminal device 110 transmits 225, to the second terminal device 120, first data on a first resource of the first candidate resource set. The first terminal device 110 may transmit the first data on the PSSCH.

As such, the second terminal device 120 may also determine that the communication with the first terminal device 110 is in power saving mode. In this case, the second terminal device 120 determines 230 the first feedback occasion for the first data. As discussed above, the first feedback occasion is mapped to the first candidate resource set which includes the first resource.

The second terminal device 120 may then transmit a first feedback message to the first data on the PSFCH. The first terminal device 110 receives 235, from the second terminal device 120, the first feedback message to the first data during the first feedback occasion.

Figure 5:
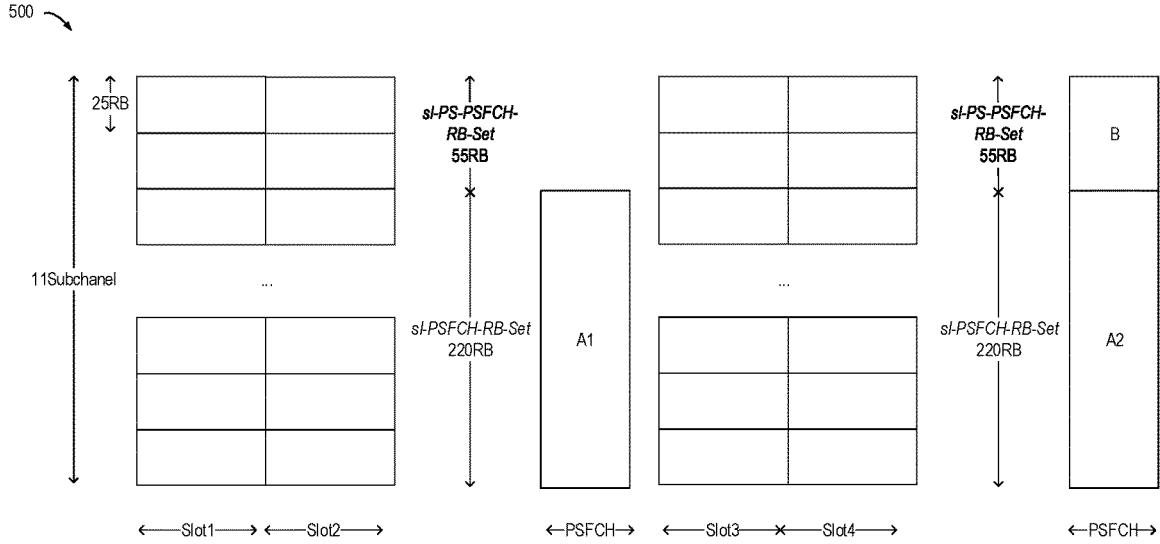
FIG. 5 illustrates a schematic diagram of resource allocations for the feedback on the PSFCH in the power saving mode and in a non-power saving mode.

FIG. 5 illustrates a schematic diagram of resource allocations for the feedback on the PSFCH in the power saving mode and in a non-power saving mode. As shown in FIG. 5, the non-reserved resource blocks of a resource on the PSFCH, denoted by A1, is mapped to the transmission in slots 1 and 2 on the PSSCH, which is in the non-power saving mode. The non-reserved resource blocks of the fourth resource on the PSFCH, denoted by A2, is mapped to the transmission in slots 3 and 4 on the PSSCH, which is in the non-power saving mode. Additionally, the reserved resource blocks of the fourth resource, denoted by B, is mapped to the transmission in slots 1 to 4 on the PSSCH, which is in the power saving mode.

In some other embodiments, the first feedback message may be received in at least one non-reserved resource block of the fourth resource, and a rest of the non-reserved blocks of the fourth resource is for receipt of the second feedback message during the second feedback occasion.

Figure 6A:
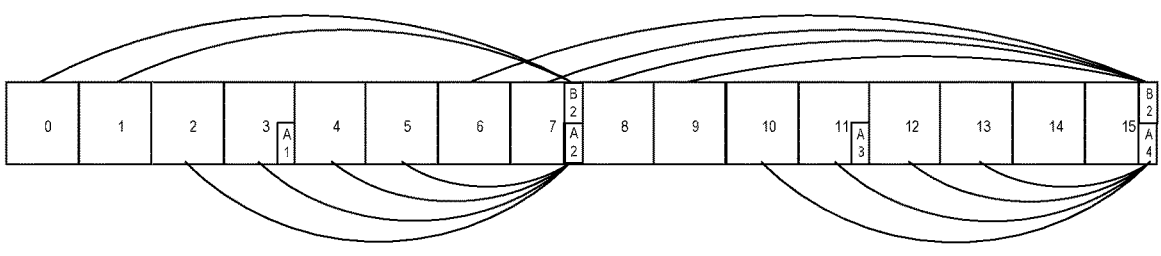
FIGS. 6A to 6C illustrate schematic diagrams of resource allocations for the feedback on the PSFCH in the power saving mode and in a non-power saving mode, respectively.
Figure 6B:
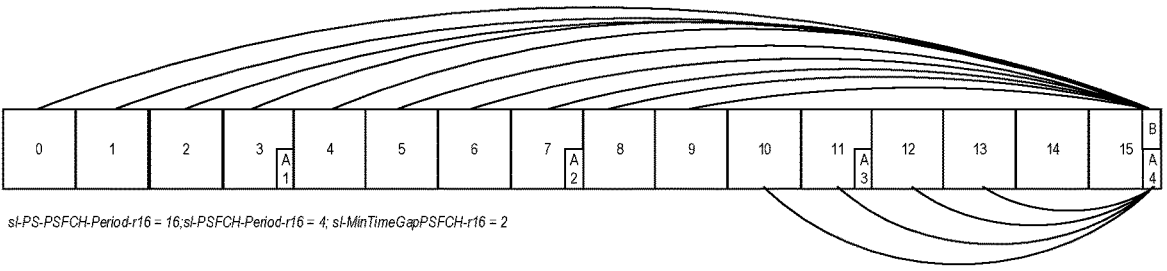
Figure 6C:
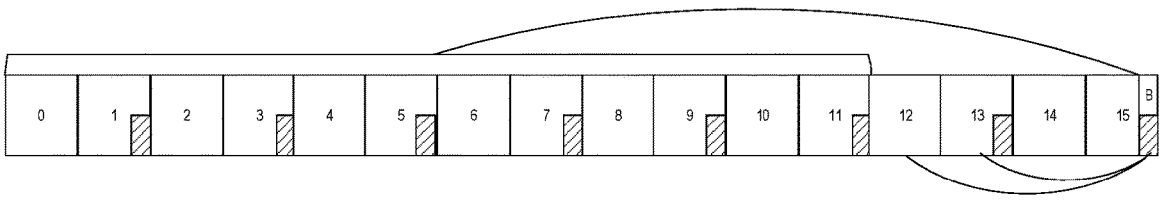

FIGS. 6A to 6C illustrate schematic diagrams of resource allocations for the feedback on the PSFCH in the power saving mode and in a non-power saving mode. As shown, B1 and B2 denote the resource blocks for the first feedback occasion preconfigured by RRC message. A1-A4 denote the conventional second feedback occasions for communications in non-power saving mode. In a case where the communication between the first and second terminal devices 110 and 120 is in power saving mode, the second terminal device 120 may transmit the first feedback message in a first slot that includes the resources for the first feedback occasion and is at least a number of slots, indicated by the parameter sl-MinTimeGapPSFCH-r16, of the resource pool after a last slot for reception of first data on the PSSCH. In the above embodiments, for the transmission in slots which is associated with both slots of the second feedback occasion and the first feedback occasion, the resource blocks used for the corresponding feedback on the PSFCH are the original ones which are configured by the parameter sl-PSFCH-RB-Set (e.g., slots 2-5 mapped to resource blocks A2, and slots 10-13 mapped to resource blocks A4). Otherwise, the resource blocks used for the corresponding feedback on the PSFCH may be the new defined set of resource blocks, B1 and B2 (e.g., slots 0 and 1 mapped to resource blocks B1, and slots 6-9 mapped to resource blocks B2).

According to embodiments of the present disclosure, there is provided a solution of sidelink feedback and a resource selection mechanism of which. In general, for a communication between two terminal devices in power saving mode, a period of a first feedback occasion for the centralized feedback is utilized, while for a communication between the terminal devices in non-power saving mode, a period of a second feedback occasion for distributed feedbacks is utilized. With such a solution, the feedback transmission and receipt occasions for the power saving terminal device will be appropriately reduced in consideration of the latency sensitive requirements of the traffic and the resource selection conflict in the sidelink resource pool.

It is to be understood that the process 200 may include additional acts not shown and/or may omit some acts as shown, and the scope of the present disclosure is not limited in this regard. Furthermore, it will be appreciated that, although primarily presented herein as being performed serially, at least a portion of the acts of the process 200 may be performed contemporaneously or in a different order than as presented in FIG. 2.

Figure 7:
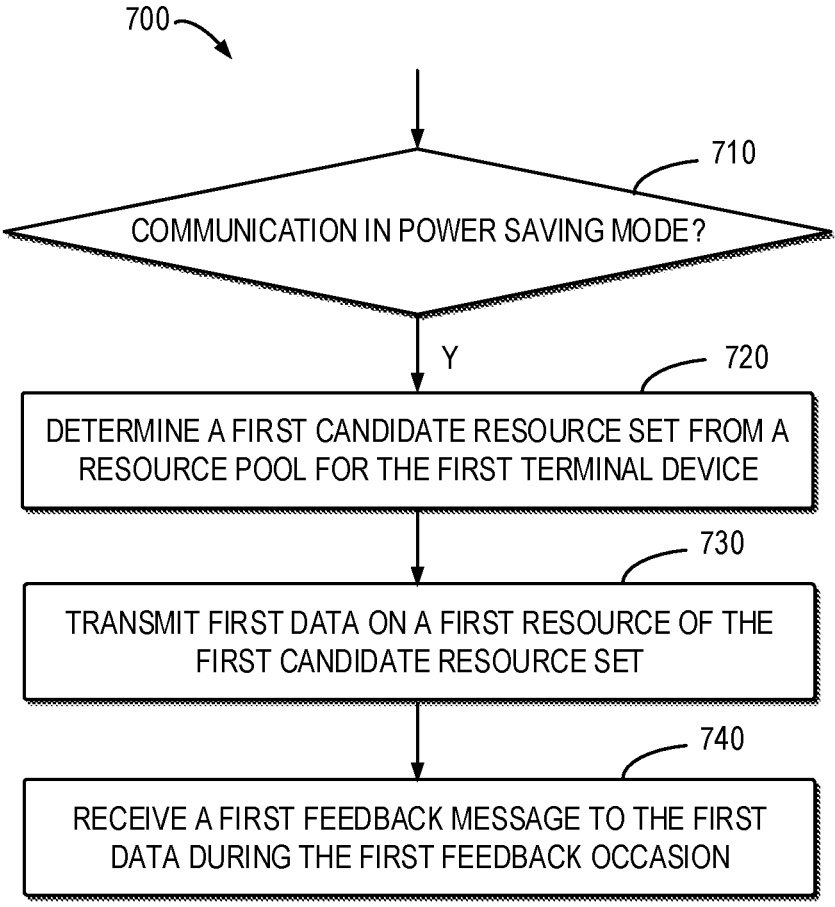
FIG. 7 illustrates a flowchart of an example method in accordance with some embodiments of the present disclosure.

FIG. 7 illustrates a flowchart of an example method 700 in accordance with some embodiments of the present disclosure. In some embodiments, the method 700 can be implemented at a terminal device, such as the first terminal device 110 as shown in FIG. 1. Additionally, or alternatively, the method 700 can also be implemented at other terminal devices not shown in FIG. 1. For the purpose of discussion, the method 700 will be described with reference to FIG. 1 as performed by the first terminal device 110 without loss of generality.

The first terminal device 110 determines 710 whether a communication with the second terminal device 120 is in power saving mode. In some embodiments, the first terminal device 110 may determine that the communication with the second terminal device 120 is in the power saving mode based on a power saving indicator preconfigured by a higher layer of the first terminal device 110, a capability report of at least one of the first and second terminal device 110 and 120. In some other embodiments, the first terminal device 110 may determine that the communication with the second terminal device 120 is in the power saving mode based on a resource selection scheme for at least one of the first and second terminal devices 110 and 120 being a partial sensing scheme or a random selection scheme.

In the case where the first terminal device 110 determines, at 710, the communication is in power saving mode, at 720, the first terminal device 110 determines the first candidate resource set from the resource pool for the first terminal device 110. The first candidate resource set is mapped to the first feedback occasion for the second terminal device 120.

In some embodiments, the first terminal device 110 may determine the first candidate resource set based on sidelink parameters preconfigured by the higher layer of the first terminal device 110. The sidelink parameters may indicate a duration and a start resource index of the first candidate resource set, and a number of candidate resource sets comprising the first candidate resource set. Each of the candidate resource sets may be alternatively arranged in a time domain.

In some embodiments, the first terminal device 110 may determine the first feedback occasion from a preconfigured set of feedback occasions. The first terminal device 110 may then determine the first candidate resource set based on a mapping rule indicating the mapping between the first candidate resource set and the first feedback occasion.

In some embodiments, the first terminal device 110 may determine a first subset of feedback occasions for the first candidate resource set from a preconfigured set of feedback occasions. The first subset of feedback occasions may be determined based on a terminal identity associated with the first terminal device, number of candidate resource sets and a number of consecutive feedback occasions for a candidate resource set. The terminal identity associated with the first terminal device 110 may include one of terminal identities of the first and second terminal devices 110 and 120. Each of the candidate resource sets may be alternatively arranged in a time domain. The first terminal device may then select the first feedback occasion from the first subset of the feedback occasions.

In some embodiments, the first terminal device 110 may determine the first feedback occasion based on its transmission on a further resource. For example, if a second resource is selected by the first terminal device 110 for transmission of second data, the first terminal device 110 may determine that the second resource is mapped to the first feedback occasion. In this case, the first terminal device 110 may select the first feedback occasion for receipt of the first feedback message. In this way, from the perspective of the Tx UE, more than one feedback message can be received in a single feedback occasion.

In some other embodiments, the first terminal device 110 may determine the first feedback occasion based on other transmissions to the second terminal device 120. For example, the first terminal device 110 may determine that a third resource is selected, by the third terminal device 130, for transmission of third data to the second terminal device 120. The first terminal device 110 may determine that the third resource is mapped to the first feedback occasion. In this case, to reduce the transmission of feedback for the second terminal device 120, the first terminal device 110 may select the first feedback occasion for receipt of the first feedback message. In this way, from the perspective of the Rx UE, more than one feedback message can be transmitted in a single feedback occasion.

At 730, the first terminal device 110 transmits, to the second terminal device 120, first data on a first resource of the first candidate resource set. In some embodiments, the first terminal device 110 may determine a set of unoccupied resources from the first candidate resource set. For example, the physical layer of the first terminal device 110 may report an intersection of the unoccupied resources in the resource pool and the first candidate resource set to the MAC layer of the first terminal device 110. The MAC layer may then select the first resource from the intersection.

In some other embodiments, the first terminal device 110 may determine a set of unoccupied resources from the resource pool. The first terminal device 110 may then determine, from the first candidate resource set and based on the set of unoccupied resources, a subset of unoccupied resources. The first terminal device 110 may adjust probabilities of the first candidate resource set by increasing probabilities of the subset of unoccupied resources, such that the first resource is selected from the adjusted first candidate resource set.

At 740, the first terminal device 110 receives, from the second terminal device 120, the first feedback message to the first data during the first feedback occasion. In some embodiments, the period of the first feedback occasion may be longer than the period of the second feedback occasion for the communication in non-power saving mode.

In the above embodiments, the first feedback occasion may correspond to a fourth resource, the first feedback message is received in at least one reserved resource block of the fourth resource, and non-reserved resource blocks of the fourth resource is for receipt of a second feedback message during the second feedback occasion.

In some other embodiments, the first feedback message is received in at least one non-reserved resource block of the fourth resource, and a rest of the non-reserved blocks of the fourth resource is for receipt of a second feedback message during the second feedback occasion.

In some other embodiments, the first terminal device 110 may receive the RRC message from the network device 102. The RRC message may indicate indices of resources allocated for the first feedback occasion or indices of resources allocated for the second feedback occasion. The first terminal device 110 may then determine the period of the first feedback occasion based on the radio resource control message.

In some other embodiments, the first terminal device 110 may transmit the SCI to the second terminal device 120, which indicates a scaling factor of the second feedback occasion. The SCI may cause the second terminal device 120 to determine whether the first feedback occasion or the second feedback occasion is activated. If the second terminal device 120 determines that the first feedback occasion is activated, the second terminal device 120 may determine the period of the first feedback occasion based on the scaling factor and the period of the second feedback occasion.

In some other embodiments, the first terminal device 110 may transmit the SCI indicating that the first feedback occasion is activated to the second terminal device. In these embodiments, the RRC message further indicates the period of the first feedback occasion and a scaling factor of the second feedback occasion. The period of the first feedback occasion may be determined based on the scaling factor and the period of the second feedback occasion.

According to embodiment of the present disclosure, the transmission and receipt of the HARQ feedback on the PSFCH can be appropriately reduced, and at the same time ensuring the latency sensitive requirements of the traffic. Additionally, by using the reserved resource blocks, the conflict of resource selection for HARQ feedback can be effectively avoided.

Figure 8:
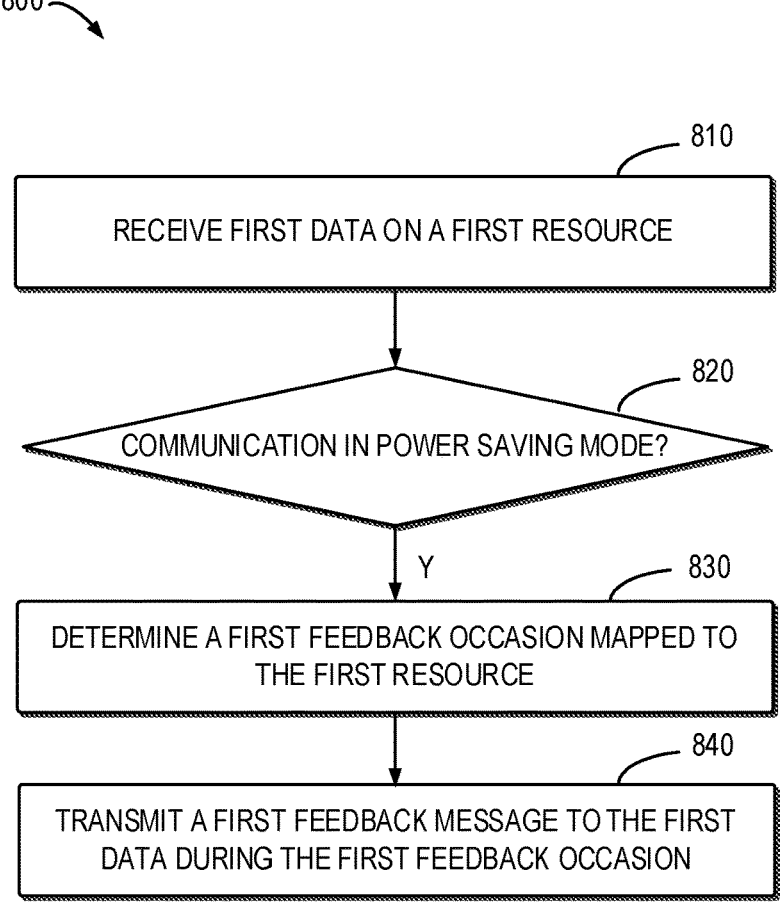
FIG. 8 illustrates a flowchart of another example method in accordance with some embodiments of the present disclosure.

FIG. 8 illustrates a flowchart of another example method 800 in accordance with some embodiments of the present disclosure. In some embodiments, the method 800 can be implemented at a terminal device, such as the second terminal device 120 as shown in FIG. 1. Additionally, or alternatively, the method 800 can also be implemented at other terminal devices not shown in FIG. 1. For the purpose of discussion, the method 800 will be described with reference to FIG. 1 as performed by the second terminal device 120 without loss of generality.

At 810, the second terminal device 120 receives first data on a first resource from the first terminal device 110. The second terminal device 120 determines 820 whether the communication with the first terminal device 110 is in power saving mode. In some embodiments, the second terminal device 120 may determine that the communication with the first terminal device 110 is in the power saving mode based on a power saving indicator preconfigured by a higher layer of the second terminal device 120, a capability report of at least one of the first and second terminal device 110 and 120. In some embodiments, the second terminal device 120 may determine that the communication with the first terminal device 110 is in the power saving mode based on a resource selection scheme for at least one of the first and second terminal devices 110 and 120 being a partial sensing scheme or a random selection scheme.

In the case where the communication with the first terminal device 110 is determined to be in power saving mode, the second terminal device 120 determines, at 830, the first feedback occasion for the second terminal device 120. The first feedback occasion is mapped to a first candidate resource set including the first resource. By way of example, the first feedback occasion may be determined based on a mapping rule which indicates the mapping between the first candidate resource set and the first feedback occasion.

In some embodiments, the second terminal device 120 may receive the radio resource control (RRC) message from the network device 102. The RRC message may indicate the period of the first feedback occasion, or alternatively, a scaling factor of the second feedback occasion. The second terminal device 120 may determine the first feedback occasion based on the RRC message.

By way of example, the RRC message may indicate the period of the first feedback occasion by a parameter sl-PS-PSFCH-Period, such as, 8, 16, 32 and so on. By way of another example, the RRC message may indicate the scaling factor of the second feedback occasion by a parameter sl-PSFCH-Period, such as, 2, 3, 4 and so on. In this example, the period of the first feedback occasion may be determined by scaling the period of the second feedback occasion based on the scaling factor.

In some embodiments, the second terminal device 120 may receive the SCI from the first terminal device 110. The SCI may be in a new format, such as, a format 2-C, and a field of the second stage SCI may indicate whether the first feedback occasion preconfigured by the RRC message or the conventional second feedback occasion is activated. For example, a value "10", "11" of the second stage SCI format in the first stage SCI may indicate the new format 2-C. If the first feedback occasion is activated, the second terminal device 120 may determine the period of the first feedback occasion based on the scaling factor and the period of the second feedback occasion.

In some embodiments, the RRC message may indicate indices of resources allocated for the first feedback occasion, or alternatively, indices of resources allocated for the second feedback occasion and so on. By way of example, the RRC message may indicate indices of resources allocated for the first feedback occasion by a new parameter sl-PS-PSFCH-RB-Set. By way of another example, the RRC message may indicate indices of resources allocated for the second feedback occasion by the parameter sl-PSFCH-RB-Set. In this case, the second terminal device 120 may then determine the remaining resources in the resource pool, namely, the resources of the resource pool excluding the resources indicated by the parameter s1-PSFCH-RB-Set to be the resources allocated for the first feedback occasion.

The number of the resource blocks indicated by the parameter sl-PS-PSFCH-RB-Set and the number of the remaining resource blocks indicated by the parameter sl-PSFCH-RB-Set may be expected to be a multiple of $$N_{subch} \cdot N_{PSSCH}^{PSFCH},$$

where $N_{subch}$ is a number of subchannel of the resource pool and $$N_{PSSCH}^{PSFCH}$$

is a number of PSSCH slots associated with one slot on the PSFCH.

In the above embodiments, the second terminal device 120 may receive the SCI from the first terminal device 110. The SCI may be in a new format, such as, a format 2-D, and a field of the second stage SCI may indicate a scaling factor for the second feedback occasion. For example, a value of the field may be "0", "1" or "M", where "0" or "1" indicates that the conventional second feedback occasion is activated, and "M" indicates that the first feedback occasion is activated and the period of which includes a set of resource blocks=M*sl-PSFCH-Period. In this case, a value "10", "11" of the second stage SCI format in the first stage SCI may indicate the new format 2-D. If the first feedback occasion is activated, the second terminal device 120 may determine the period of the first feedback occasion based on the scaling factor and the period of the second feedback occasion.

In some embodiments, the second terminal device 120 may determine the first candidate resource set based on a duration and a start resource index of the first candidate resource set, and a number of candidate resource sets comprising the first candidate resource set. Each of the candidate resource sets may be alternatively arranged in a time domain.

In some embodiments, the second terminal device 120 may determine a first subset of feedback occasions for the first candidate resource set from a set of feedback occasions preconfigured, for example, by the higher layer. The first subset of feedback occasions may be determined based on a terminal identity associated with the first terminal device, number of candidate resource sets and a number of consecutive feedback occasions for a candidate resource set. The terminal identity associated with the first terminal device 110 may include the terminal identity of the first and second terminal devices 110 and 120. Each of the candidate resource sets may be alternatively arranged in a time domain. The second terminal device 120 may then select the first feedback occasion from the first subset of the feedback occasions.

In some embodiments, the period of the first feedback occasion is longer than a period of a second feedback occasion for a communication in a non-power saving mode. By way of example, the first feedback occasion may correspond to a fourth resource, and the first feedback message may be transmitted in at least one reserved resource block of the fourth resource. Additionally, or alternatively, non-reserved resource blocks of the fourth resource may be used for transmission of the second feedback message during the second feedback occasion.

By way of another example, the first feedback message may be transmitted in at least one non-reserved resource block of the fourth resource, and a rest of the non-reserved blocks of the fourth resource may be used for transmission of a second feedback message during the second feedback occasion.

At 840, the second terminal device 120 transmits, to the first terminal device 110, the first feedback message to the first data during the first feedback occasion.

According to embodiment of the present disclosure, the transmission and receipt of the HARQ feedback on the PSFCH can be appropriately reduced, while ensuring the latency sensitive requirements of the traffic. Such a solution can achieve a tradeoff between the power consumption and the system performance. In this way, the reliability and resource use efficiency for sidelink communications can be significantly improved.

Figure 9:
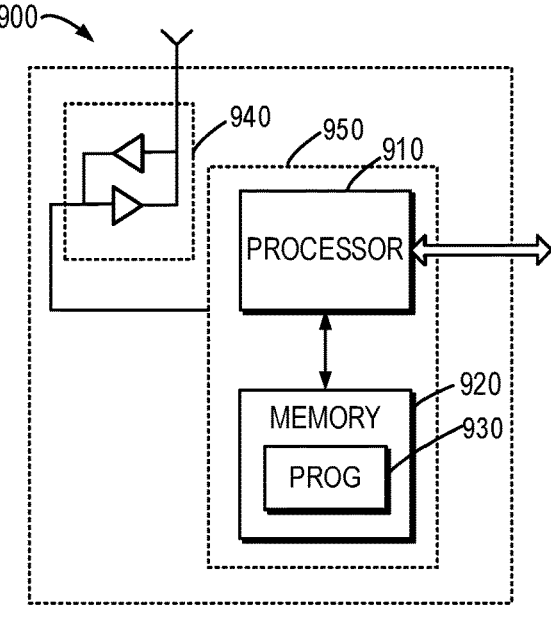
FIG. 9 is a simplified block diagram of a device that is suitable for implementing some embodiments of the present disclosure.

FIG. 9 is a simplified block diagram of a device 900 that is suitable for implementing some embodiments of the present disclosure. The device 900 can be considered as a further example embodiment of the terminal devices 110 and 120 as well as the network device 102 as shown in FIG. 1. Accordingly, the device 900 can be implemented at or as at least a part of the terminal devices 110 and 120 as well as the network device 102.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 920 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 930 is assumed to include program instructions that, when executed by the associated processor 910, enable the device 900 to operate in accordance with the embodiments of the present disclosure, as discussed herein with reference to any of FIGS. 2, 7 and 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general-purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

In some embodiments, a first terminal device comprises circuitry configured to: in accordance with a determination that a communication between the first terminal device and a second terminal device is in a power saving mode, determine, at the first terminal device, a first candidate resource set from a resource pool for the first terminal device, the first candidate resource set being mapped to a first feedback occasion for the second terminal device; transmit, to the second terminal device, first data on a first resource of the first candidate resource set; and receive, from the second terminal device, a first feedback message to the first data during the first feedback occasion.

In some embodiments, the circuitry is further configured to determine the first candidate resource set by: determining that the communication between the first terminal device and the second terminal device is in the power saving mode based on at least one of the following: a power saving indicator preconfigured by a higher layer of the first terminal device, a capability report of at least one of the first and second terminal devices; or a resource selection scheme for at least one of the first and second terminal devices being a partial sensing scheme or a random selection scheme.

In some embodiments, the circuitry is configured to determine the first candidate resource set by: determining the first candidate resource set based on a duration and a start resource index of the first candidate resource set, and a number of candidate resource sets comprising the first candidate resource set, each of the candidate resource sets alternatively arranged in a time domain.

In some embodiments, the circuitry is configured to determine the first candidate resource set by: determining, from a preconfigured set of feedback occasions, the first feedback occasion; and determining the first candidate resource set based on a mapping rule indicating the mapping between the first candidate resource set and the first feedback occasion.

In some embodiments, the circuitry is configured to determine the first feedback occasion further by: determining, from a preconfigured set of feedback occasions, a first subset of feedback occasions for the first candidate resource set based on a terminal identity associated with the first terminal device, number of candidate resource sets and a number of consecutive feedback occasions for a candidate resource set, the terminal identity comprising one of terminal identities of the first and second terminal devices, each of the candidate resource sets alternatively arranged in a time domain; and selecting the first feedback occasion from the first subset of the feedback occasions.

In some embodiments, the circuitry is configured to determine the first feedback occasion by: in accordance with a determination that a second resource is selected for transmission of second data from the first terminal device, determining that the second resource is mapped to the first feedback occasion; and selecting the first feedback occasion for receipt of the first feedback message.

In some embodiments, the circuitry is configured to determine the first feedback occasion by: in accordance with a determination that a third resource is selected, by a third terminal device different from the first terminal device, for transmission of third data to the second terminal device, determining that the third resource is mapped to the first feedback occasion; and selecting the first feedback occasion for receipt of the first feedback message.

In some embodiments, the circuitry is further configured to: determine a set of unoccupied resources from the first candidate resource set; and select the first resource from the set of unoccupied resources.

In some embodiments, the first terminal device comprises circuitry configured to: determine a set of unoccupied resources from the resource pool; determine, from the first candidate resource set and based on the set of unoccupied resources, a subset of unoccupied resources; and adjust probabilities of the first candidate resource set by increasing probabilities of the subset of unoccupied resources, such that the first resource is selected from the adjusted first candidate resource set.

In some embodiments, a period of the first feedback occasion is longer than a period of a second feedback occasion for a communication in a non-power saving mode.

In some embodiments, the first feedback occasion corresponds to a fourth resource, the first feedback message is received in at least one reserved resource block of the fourth resource, and non-reserved resource blocks of the fourth resource is for receipt of a second feedback message during the second feedback occasion.

In some embodiments, the first feedback occasion corresponds to a fourth resource, the first feedback message is received in at least one non-reserved resource block of the fourth resource, and a rest of the non-reserved blocks of the fourth resource is for receipt of a second feedback message during the second feedback occasion.

In some embodiments, the first terminal device comprises circuitry configured to: receive a radio resource control message from a network device; and determine the period of the first feedback occasion based on the radio resource control message.

In some embodiments, the first terminal device comprises circuitry configured to: transmit, to the second terminal device, sidelink control information indicating a scaling factor of the second feedback occasion, causing the second terminal device to: determine whether the first feedback occasion or the second feedback occasion is activated; and in accordance with a determination that the first feedback occasion is activated, determine the period of the first feedback occasion based on the scaling factor and the period of the second feedback occasion.

In some embodiments, the radio resource control message indicates one of the following: indices of resources allocated for the first feedback occasion; and indices of resources allocated for the second feedback occasion.

In some embodiments, the first terminal device comprises circuitry configured to: transmitting, to the second terminal device, sidelink control information indicating that the first feedback occasion is activated, and wherein the radio resource control message further indicates one of the following: the period of the first feedback occasion; and a scaling factor of the second feedback occasion, the period of the first feedback occasion being determined based on the scaling factor and the period of the second feedback occasion.

In some embodiments, a second terminal device comprises circuitry configured to: receive, at a second terminal device and from a first terminal device, first data on a first resource; in accordance with a determination that a communication between the first terminal device and the second terminal device is in a power saving mode, determine a first feedback occasion for the second terminal device, the first feedback occasion being mapped to a first candidate resource set comprising the first resource; and transmit, to the first terminal device, a first feedback message to the first data during the first feedback occasion.

In some embodiments, the second terminal device comprises circuitry configured to determine that the communication between the first terminal device and the second terminal device is in the power saving mode based on at least one of the following: a power saving indicator preconfigured by a higher layer of the first terminal device, a capability report of at least one of the first and second terminal devices; or a resource selection scheme for at least one of the first and second terminal devices being a partial sensing scheme or a random selection scheme.

In some embodiments, the second terminal device comprises circuitry configured to determine the first candidate resource set based on a duration and a start resource index of the first candidate resource set, and a number of candidate resource sets comprising the first candidate resource set, each of the candidate resource sets alternatively arranged in a time domain.

In some embodiments, the first feedback occasion is determined based on a mapping rule indicating the mapping between the first candidate resource set and the first feedback occasion.

In some embodiments, the second terminal device comprises circuitry configured to determine the first feedback occasion further by: determining, from a preconfigured set of feedback occasions, a first subset of feedback occasions for the first candidate resource set based on a terminal identity associated with the first terminal device, number of candidate resource sets and a number of consecutive feedback occasions for a candidate resource set, the terminal identity comprising one of terminal identities of the first and second terminal devices, each of the candidate resource sets alternatively arranged in a time domain; and selecting the first feedback occasion from the first subset of the feedback occasions.

In some embodiments, a period of the first feedback occasion is longer than a period of a second feedback occasion for a communication in a non-power saving mode.

In some embodiments, the first feedback occasion corresponds to a fourth resource, the first feedback message is transmitted in at least one reserved resource block of the fourth resource, and non-reserved resource blocks of the fourth resource is for transmission of a second feedback message during the second feedback occasion.

In some embodiments, the first feedback occasion corresponds to a fourth resource, the first feedback message is transmitted in at least one non-reserved resource block of the fourth resource, and a rest of the non-reserved blocks of the fourth resource is for transmission of a second feedback message during the second feedback occasion.

In some embodiments, the second terminal device comprises circuitry configured to: receive a radio resource control message from a network device; and determining the first feedback occasion based on the radio resource control message.

In some embodiments, the second terminal device comprises circuitry configured to: receive, from the first terminal device, sidelink control information indicating a scaling factor of the second feedback occasion; determine whether the first feedback occasion or the second feedback occasion is activated, based on the sidelink control information; and in accordance with a determination that the first feedback occasion is activated, determining the period of the first feedback occasion based on the scaling factor and the period of the second feedback occasion.

In some embodiments, the radio resource control message indicates one of the following: indices of resources allocated for the first feedback occasion; and indices of resources allocated for the second feedback occasion.

In some embodiments, the second terminal device comprises circuitry configured to: receive, from the first terminal device, sidelink control information indicating that the first feedback occasion is activated, and wherein the radio resource control message further indicates one of the following: the period of the first feedback occasion; and a scaling factor of the second feedback occasion, the period of the first feedback occasion being determined based on the scaling factor and the period of the second feedback occasion.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 7 and 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
   receiving configuration information indicating a plurality of resource block (RB) sets used for a plurality of physical sidelink feedback channel (PSFCH) occasions for a physical sidelink shared channel (PSSCH) transmission, wherein each RB set in the plurality of RB sets corresponds to a PSFCH occasion of the plurality of PSFCH occasions; and
   based on the configuration information, determining a RB set in a resource pool for one PFSCH occasion from the plurality of PSFCH occasions, wherein a number of RBs in the RB set is a multiple of $$N_{subch} \cdot N_{PSSCH}^{PSFCH},$$

where $N_{subch}$ is a number of sub-channels of the resource pool and $$N_{PSSCH}^{PSFCH}$$

is a number of PSSCH slots associated with a PSFCH slot.

2. A terminal device comprising a processor configured to:

receive configuration information indicating a plurality of resource block (RB) sets used for a plurality of physical sidelink feedback channel (PSFCH) occasions for a physical sidelink shared channel (PSSCH) transmission, wherein each RB set in the plurality of RB sets corresponds to a PSFCH occasion of the plurality of PSFCH occasions; and based on the configuration information, determine a RB set in a resource pool for one PFSCH occasion from the plurality of PSFCH occasions, wherein a number of RBs in the RB set is a multiple of $$N_{subch} \cdot N_{PSSCH}^{PSFCH},$$

where $N_{subch}$ is a number of sub-channels of the resource pool and $$N_{PSSCH}^{PSFCH}$$

is a number of PSSCH slots associated with a PSFCH slot.

* * * * *